(12) United States Patent
Van Lookeren Campagne

(10) Patent No.: US 12,552,241 B2
(45) Date of Patent: Feb. 17, 2026

(54) TRUCK AXLE WITH DIRECT DRIVE ELECTRIC MOTORS

(71) Applicant: TRACTION INNOVATION B.V., Amsterdam (NL)

(72) Inventor: Pieter Theodoor Van Lookeren Campagne, Amsterdam (NL)

(73) Assignee: Traction Innovation B.V., Amsterdam (NL)

( * ) Notice: Subject to any disclaimer, the term of this patent is extended or adjusted under 35 U.S.C. 154(b) by 15 days.

(21) Appl. No.: 18/875,330

(22) PCT Filed: Jun. 30, 2023

(86) PCT No.: PCT/EP2023/067995
§ 371 (c)(1),
(2) Date: Dec. 16, 2024

(87) PCT Pub. No.: WO2024/003348
PCT Pub. Date: Jan. 4, 2024

(65) Prior Publication Data
US 2025/0170884 A1     May 29, 2025

(30) Foreign Application Priority Data

Jul. 1, 2022  (NL) ..................................... 2032355
Apr. 5, 2023  (NL) ..................................... 2034505

(51) Int. Cl.
*B60K 7/00*         (2006.01)
*B60G 15/06*        (2006.01)
(Continued)

(52) U.S. Cl.
CPC ............ *B60K 7/0007* (2013.01); *B60G 15/06* (2013.01); *B60L 7/02* (2013.01); *B60L 7/24* (2013.01);
(Continued)

(58) Field of Classification Search
CPC ........ B60K 7/0007; B60K 1/20; B60K 1/185; B60K 7/085; B60K 7/102; B60K 21/14;
(Continued)

(56) References Cited

U.S. PATENT DOCUMENTS 4,797,564 A * 1/1989 Ramunas ............. B25J 17/0208
                                                 901/17
4,799,564 A   1/1989 Iijima et al.
(Continued)

FOREIGN PATENT DOCUMENTS

DE          19732637 C5    9/2006

OTHER PUBLICATIONS

International Search Report and Written Opinion dated Oct. 2, 2023 in co-pending PCT Patent Application No. PCT/EP2023/067995.

*Primary Examiner* — Hau V Phan
(74) *Attorney, Agent, or Firm* — Perilla, Knox & Hildebrandt LLP

(57) ABSTRACT

The invention is directed to a truck axle comprising two hub carriers connected by an axle bridge structure. Each hub carrier comprises a stator of a direct drive electric motor and carries a rotary assembly comprising a rim flange to support a rim for a single tyre. The hub carrier comprises a first part which is laterally positioned within the rim and a second part which is laterally positioned next to the rim. The rotary assembly is comprised of a wheel hub shaft which is laterally positioned within the rim and tyre combination and a second part which is laterally positioned next to the rim and tyre combination. The second part of the hub carrier comprises the stator and the second part of the rotary assembly comprises a rotor of the electric motor.

33 Claims, 9 Drawing Sheets

(51) Int. Cl.
*B60L 7/02* (2006.01)
*B60L 7/24* (2006.01)
*B60T 1/06* (2006.01)
*B62D 21/02* (2006.01)
*H02K 1/18* (2006.01)
*H02K 1/20* (2006.01)
*H02K 7/08* (2006.01)
*H02K 7/102* (2006.01)
*H02K 21/14* (2006.01)

(52) U.S. Cl.
CPC .............. *B60T 1/065* (2013.01); *B60T 1/067* (2013.01); *B62D 21/02* (2013.01); *H02K 1/185* (2013.01); *H02K 1/20* (2013.01); *H02K 7/085* (2013.01); *H02K 7/102* (2013.01); *H02K 21/14* (2013.01); *B60K 2007/0038* (2013.01); *B60K 2007/0092* (2013.01)

(58) Field of Classification Search
CPC ... B60L 7/02; B60L 7/24; B60G 15/16; B60T 1/065; B60T 1/067
USPC ........................................................ 180/65.51
See application file for complete search history.

(56) References Cited

U.S. PATENT DOCUMENTS

| | | | |
|---|---|---|---|
| 10,707,798 B2 | 7/2020 | Krishnamurthy et al. | |
| 2012/0142475 A1* | 6/2012 | Shibukawa | B60K 7/0007 475/159 |
| 2012/0205966 A1* | 8/2012 | Witcher | B60K 17/046 29/525.01 |
| 2014/0125112 A1* | 5/2014 | Bittlingmaier | B60B 11/06 301/6.8 |
| 2015/0084397 A1* | 3/2015 | Kudo | B60B 35/16 903/952 |
| 2015/0233467 A1* | 8/2015 | Noerenberg | F16H 57/10 192/221.1 |
| 2017/0190214 A1* | 7/2017 | Grimminger | B60T 1/065 |
| 2019/0023118 A1 | 1/2019 | Van Der Wal et al. | |
| 2019/0232783 A1 | 8/2019 | Siuchta et al. | |
| 2019/0315173 A1* | 10/2019 | Kim | B60G 7/001 |
| 2020/0016973 A1* | 1/2020 | Hagihara | F16H 57/04 |
| 2021/0122227 A1* | 4/2021 | Bindl | B60T 13/12 |
| 2021/0252967 A1* | 8/2021 | Iwabuchi | B60B 11/06 |

* cited by examiner

TRUCK AXLE WITH DIRECT DRIVE ELECTRIC MOTORS

The invention is directed to a truck axle comprising two hub carriers each having a bearing centre axis, which bearing centre axes are positioned on a common axis and wherein the two hub carriers are connected by an axle bridge structure. Each hub carrier comprises an electric motor and a wheel hub shaft comprising a rim flange to support a rim for a tyre. The invention is also directed to a truck having one or more of the invented truck axles and to a hub carrier.

Truck axles are described in US2019232783. This publications describes a truck having an combustion engine, a transmission and one or two drive axles having each two hub carriers. The drive axles are connected to the engine via a propeller shaft. The two hub carriers are typically provided with a rim having a size and design for mounting two tires. The truck may be configured with two drive axles in a so-called 6×4 configuration or with one drive axles in a so-called 6×2 configuration. The chassis of the truck is a frame to which a front axle and one or two rear drive axles are connected. The frame, that consists of two parallel chassis beams is positioned between the wheels. The chassis beams are maximally spaced away from each other to obtain a required strength. This distance is limited by the maximum allowable width of the truck.

There is a desire to provide trucks having the functional properties as the truck described in US2019232783 but with electric motors. One such a design is described in US2019/0023118. This publication describes a vehicle wheel with a rim sized for two tyres and with an in-wheel electric direct drive so-called "outer runner" motor. The inside stator of the electric motor is part of the non-rotating wheel part and the outside rotor of the electric motor is part of the rotating part supporting the rim. A disadvantage of this vehicle wheel is that the torque which can be obtained is limited. This limits the application of such a design in heavy transport applications such like in trucks. A further disadvantage is that no standard rims can be used.

The object of the present invention is to provide a truck axle which does not have the problems of the prior art solutions as here described.

This object is achieved by the following truck axle comprising two hub carriers having a bearing centre axis, which bearing centre axes are positioned on a common axis and wherein the two hub carriers are connected by an axle bridge structure,
  wherein each hub carrier comprises a stator of a direct drive electric motor and carries a rotary assembly comprising a rim flange to support a rim for a single tyre,
  wherein the hub carrier comprises of a first part which is laterally positioned within the rim and tyre combination when mounted and a second part which is laterally positioned next to the rim and tyre combination when mounted;
  wherein the second part of one hub carrier is connected to the second part of the other hub carrier by the axle bridge structure;
  wherein the rotary assembly is comprised of a wheel hub shaft and a second part which is laterally positioned next to the rim and tyre combination when mounted;
  wherein the second part of the hub carrier comprises the stator of the electric motor and the second part of the rotary assembly comprises a rotor of the electric motor.

Applicants found that by replacing the two tyre rims by a single rim for a single tyre a space becomes available for an electric motor laterally positioned next to the rim and tyre combination while remaining enough space to position the chassis frame of the truck between the two hub carriers. One single tyre can replace a double tyre combination for a truck application without negatively affecting the driving achievements of the truck. Further standard rims may be used.

In this description of the invention terms like upper, lower, above, below, behind, rear, front, inner and outer are used to describe the truck axle in the orientation in which it will be used in a truck having a driving direction. Behind and front relate to the driving direction. Radially outer and radially inner relate to relative positions with respect to a common axis. The term height is used to describe the distance to the surface, especially a road, on which in use the truck axle as part of a truck be supported. The use of these terms are not meant to limit the invention in any manner. Thus, carrier hubs and truck axles stored or transported in a different orientation are also meant by this description and claims.

The dimensions and in particular the diameter of the direct drive electric motor in this design is not limited by the dimensions of the rim as in the prior art designs. This allows that the outside diameter of the direct drive motor can be greater than the rim diameter. Because the torque of a well-designed electric torque motor is proportional with the stack length and proportional with the square of the airgap diameter it follows that less copper and permanent magnet material, such as neodymium, may be required to achieve a comparable torque as in the design of US2019/0023118. Further the torque can be higher than a design according US2019/0023118 and suffice for prolonged uphill driving. A next advantage is that the stator cooling surface can be significantly larger than in the design of US2019/0023118. This because the diameter of the cooling surface is larger than the air gap diameter in this design as will be described below. This results in a more efficient cooling of the stator.

The electric motor may be any electric motor comprising of a stator and a rotor. The electric motor may be a high rotor pole switched reluctance machine and wherein the rotor comprises a plurality of rotor poles. An example of such an electric motor is described in U.S. Ser. No. 10/707,798. The electric motor may also be the well known direct drive permanent magnet torque motor. The stator of such different motor types may be as described below. The rotor will be different in that the rotor of the drive electric torque motor will comprise permanent magnets. The rotor may also be an internal permanent magnet (IPM) rotor, or the rotor may be the rotor of an asynchronous induction motor.

Direct drive electric motor means that no gears, such as planetary gears and spur gears are present between the electric torque motor and the wheel hub shaft.

Each hub carrier carries a wheel hub shaft that may comprise a rim flange to support a rim for a single tyre. The wheel hub shaft laterally transmits the torque from the electric motor to the wheel hub flange. The wheel hub shaft also laterally transmits the brake torque from the brake to the wheel hub flange. The dimensions of the hub carrier suitably does not allow support of a double tyre rim configuration as for example described in US2019/0023118. The tyre dimensions and/or properties are suitably such that a single tyre can replace two conventional tyres. An example of such a tyre is a so-called super single tyre. A super single tyre is a well known type of tyre which may be used to replace two tyres, typically to replace dual truck or bus tyres. Super single tyres may be obtained from tyre manufactures such as Michelin as the Michelin X One Line Energy D2 445/50R22,5 or Michelin X One XDN2 495/45R22,5 tyre. The width of a super single tyre will be less than the combined width of the two tyres it aims to replace.

The invention is thus especially directed to a hub carrier which allows to support a rim for a single tyre which has a nominal width of less than 500 mm. More preferably to a hub carrier which allows to support a rim for a single tyre which has a nominal width of between 350 and 500 mm and even more preferably between 400 and 500 mm.

The single tyre, when mounted on the rim, may comprise pressure monitoring.

The second part of the hub carrier comprises of a stator of the electric torque motor and the second part of the rotary assembly comprises a rotor of the electric torque motor. When electric currents run through the stator windings, torque is transmitted to the rotor and the wheel hub driveshaft. Torque will result in a rotation of the wheel hub drive shaft relative to the hub carrier and as a result move the vehicle.

The stator is suitably enclosed in a load bearing housing as part of the second part of the hub carrier. This housing may be tubular or substantially tubular having for example flattened outer surfaces. Such flattened outer surfaces may face the road. Flattened surfaces may also be present at the front and rear outer surfaces for connecting with the axle bridge. The stator is suitably positioned at the radially inner side of the load bearing housing. The stator may be encapsulated by a resin before or after it is positioned at the radially inner side of the load bearing housing.

The stator will comprise of a lamination stack having a substantially tubular shape as positioned at the radially inner side of the load bearing housing. Preferably the radial outer surface of lamination stack rests against the radially inner surface of the load bearing housing. In this way the distance between the outer surface of the lamination stack and the bearing centre axis is as large as possible. This distance may also be expressed as the outer diameter of the tubular lamination stack. The outer diameter of the tubular lamination stack is not limited by the dimensions of the rim as in some prior art designs. This because the second part of the hub carrier is positioned next to the area where this rim is present. Preferably this outer diameter of the tubular lamination stack of the stator is therefore more than 90% of the largest diameter of the rim and more preferably at least about equal to the largest diameter of the rim or above. The maximum outer diameter of the tubular lamination stack of the stator will be determined by the maximum allowable outer diameter of the load bearing housing. The radial outer end at the lowest point of the circumference of the load bearing housing and thus also the lowest point of the hub carrier is limited by the minimum allowable distance to a road surface. When the stator and its lamination stack have a diameter as described above a radially inner space is provided for a brake assembly.

Alternatively the first part and the second part of the hub carriers are load bearing and wherein a second part of one of the hub carriers is connected to the second part of the other hub carrier by an axle bridge running along the bearing centre axis. The rotary assembly is then rotatably positioned around the hub carrier by means of two bearing. The hub carrier will then comprise a spindle. The structure may be similar to a standard rear axle structure.

The stator preferably has a tubular shape and is positioned at a radially inner side of a stator carrier. The stator carrier can be an integral part of the hub carrier or part of a bolted or welded assembly. The hub carrier preferably includes a flange, ie the stator carrier, for mounting the stator on the inner end and a bracket to support the brake shoe anchor pins (not shown in cross section drawing).

The stator carrier is not load bearing as in the embodiments described above. Instead the first part and the second part of the hub carrier as present around the bearing centre axes, ie the spindle, are load bearing. For this reason the axle bridge is preferably a round or square section tube running along the bearing centre axis and connected to the left and right second parts of the hub carriers. Such a connection may be bolted or welded.

The wheel hub shaft rotates around the hub carrier, ie around the spindle, on outer ring rotating bearings. The wheel hub shaft includes a flange on the outer end to which the wheel is mounted and a flange on the inner end to which the motor rotor is mounted and to which the brake drum is mounted.

The stator preferably comprises of a lamination stack having a tubular shape as positioned at the radially inner side of a housing of the second part of the hub carrier and wherein the rotor is present at the radially inner side of the stator.

The above design may be altered in that the stator is present at the exterior of the second part of the hub carrier. The rotor, as part of the second part of the rotary assembly, is present at the radially outer side of the stator. Preferably the stator comprises a lamination stack having a tubular shape as positioned at the radially outer side of a housing of the second part of the hub carrier and wherein the rotor is present at the radially outer side of the stator. This results in that the outer side of the second part of the rotary assembly will rotate. This results in that the rotary movement of the second rotary assembly is visible from the exterior. For this reason such a design is also referred to as an outrunner or by the German name Aussenlaeufer.

The second part of the hub carrier preferably has a tubular or substantially tubular shaped stator carrier. The stator may be encapsulated by a resin before or after it is positioned at the outer side of the tubular shaped stator carrier. The stator of this variant will comprise of a lamination stack having a substantially tubular shape as positioned at the outer side of the stator carrier. The distance between the radially outer surface of the lamination stack and the bearing centre axes may be large for this variant. This distance may also be expressed as the outer diameter of the tubular lamination stack. The outer diameter of the tubular lamination stack of this second variant is also not limited by the dimensions of the rim as in some prior art designs. Preferably this outer diameter of the tubular lamination stack of the stator is therefore more than 90% of the largest diameter of the rim and more preferably at least about equal to the largest diameter of the rim or above. The maximum outer diameter of the tubular lamination stack of the stator will be determined by the maximum allowable outer diameter of the second part of the rotary assembly. The radial outer end at the lowest point of the circumference of the rotary assembly and thus also the lowest point of the hub carrier is limited by the minimum allowable distance to a road surface. When the stator and its lamination stack have a diameter as described above an inner space is provided for a brake assembly.

The length of the stator lamination stack and winding heads is limited by on one side the tyre-rim combination, whereby the tyre is at its widest dimension due to static and dynamic loads, and on the other side by the chassis beams of the chassis frame of the truck. Some free space between the chassis beams and the electric motor is required to accommodate movements of the axle with respect to the vehicle structure.

Cooling channels are suitably present between the outer housing and the stator. For example the lamination stack may be mounted into a sleeve that includes cooling channels or cooling channels may be provided at the radially inner surface of the load bearing housing or at the radially outer surface of the stator carrier. In use a liquid cooling medium flows through these cooling channels to cool the stator. The resulting cooling area will be relatively large and significantly larger than for example the cooling area of US2019/0023118. Especially when the maximum largest diameter of the tubular lamination stack is within the preferred ranges. This larger cooling area is advantageous because of the resulting efficient cooling and resulting higher efficiency.

The stator and rotor may have a configuration known to the skilled person. The stator may be a concentrated winding, distributed winding or a hairpin winding. The stator will be connected to a drive unit that is connected to a battery or a fuel cell or other means to generate electricity via one or more power wires.

The second part of the rotary assembly comprises a rotor of the electric motor. The rotor is aligned with the stator such that between them a small tubular shaped air gap is present. When the electric motor is a permanent magnet torque motor the rotor will comprise permanent magnets. This rotor may be a steel tube provided with a space for carrying permanent magnets, also referred to as the steel rotor tube. The permanent magnets are positioned at the external surface of the steel rotor tube such as to face the stator. A sleeve, for example a stainless steel or carbon fibre sleeve, may be present around the magnets to further fix the magnets within the steel rotor tube. The rotor has a large number of magnetic poles, for example about a hundred poles.

The electric motor is advantageously adapted for regenerative braking. Regenerative braking recovers most of the kinetic energy that would otherwise turn into heat and instead converts it into electric energy. In this system, the motor drives the wheels during acceleration or cruising, but the wheels drive the motor while decelerating. This two-way energy flow allows the motor to act as a generator, resisting the rotation of the wheels and creating electric energy to recharge the vehicle's battery. In addition to regenerative braking, friction brakes are preferably present for emergency braking and/or for a parking brake. Preferably bleed resistors are present to dissipate electric energy in situations where the battery is fully charged. This allows one to decelerate using the electric motor while the battery is fully charged. This is especially relevant during prolonged downhill driving with a fully charged battery. In such a situation the friction brakes may perform in time less optimal because of overheating. By being able to dissipate the electric energy to the bleed resistors braking may then still be possible using the electric motor. The invention is thus also directed to a truck having a truck axle according to this invention, comprising preferably a drum brake, and wherein the electric motor is adapted for regenerative braking and the vehicle is further provided with one or more bleed resistors.

The rotor and especially the steel rotor tube has an internal diameter which provides an internal space where a brake can be mounted, that is connected to the rotary assembly. The brake is preferably a pneumatic actuated brake. The brake may include an emergency brake and a parking brake function. The brake may be a drum brake or a disc brake.

When a disc brake is used it is preferred to position the brake disc within the internal space of the steel rotor tube. Preferably a brake disc having a diameter of 374 mm should be able to be mounted on the rotary assembly and more preferably a brake disc having a diameter of 430 mm should be able to be mounted on the rotary assembly.

The brake disc is suitably provided with a brake calliper that shall also fit within the inner diameter of the rotor steel tube. The brake calliper is operated by a brake actuator. The brake calliper is suitably mounted at or close to the forward and backward point of the circumference of the hub carrier, such that the brake actuator is more or less situated at the same height as the common axis of the two hub carriers. This is advantageous because the brake actuator may then be located in between the beams of the axle bridge. The brake calliper will be mounted to a brake carrier that is connected to the hub carrier.

When manufacturing the truck axle according to this invention, and using a disc brake, it is preferred that the brake disc, calliper and brake carrier are preassembled on a temporary jig and mounted in a single operation to the rotary assembly and hub carrier second part after which the mounting jig is removed.

Preferably a drum brake is used as an additional brake to the regenerative braking. When a drum brake is used it is preferred that the drum brake is present in the internal space of the rotor. Such a drum brake does not require a brake calliper as described above and for that reason will require less space to be mounted. It has been found that the invented design allows a drum brake with an internal drum diameter of 420 mm to be fitted in this internal space of the rotor. A known disadvantage of the drum brake over the disc brake is that the performance of a drum brake during prolonged braking is not as good as the performance of a disc brake because of the thermal load of the drum brake. For the present application this does not necessarily has to be a disadvantage when the majority of the braking activity is performed by a regenerative braking system. The drum brakes will then in practice only be incidentally used for emergency braking or as a parking brake Because of this lesser use the thermal load will be negligible. This allows one to use the mechanically simpler drum brake instead of a disc brake. The typical disadvantages of the drum brake versus the disc brake such as ease of inspection do not apply for this design. It is even found that the drum brakes are more easy to inspect than the disc brake in this design. Further it is found that a drum brake is easier to fit as compared to a disc brake because for example a temporary jig as mounting tool is not required. A drum brake can be dimensioned such that sufficient space can become available for an internal permanent magnet rotor or the rotor of an asynchronous induction motor, that both have a smaller internal diameter than a permanent magnet rotor with surface mounted magnets.

Additionally a seal carrier is present which separates an outside environment from a sealed space in which the steel rotor tube rotates. The seal carrier may be provided with a central opening for passage of the second part of the wheel hub shaft. At this opening a seal may be present to avoid that dirt, metal scrap and the like enters this space. The seal may be a double seal with a grease filling in between.

The brake may be installed in the outside environment as is usually done. Also an enclosed rotary sensor which is part of an electric motor can be suitably located in the outside environment. More preferably the rotary sensor is mounted on the brake carrier. This sensor may be an encoder or resolver type sensor.

The wheel hub shaft is rotatably positioned within the hub carrier and is suitably laterally positioned, for its major length, within the rim and tyre combination when mounted. In a first preferred embodiment the wheel hub shaft of the rotary assembly may be rotatably positioned and supported by bearings within a axial channel as present in the hub carrier. Suitably the rotatably positioning is by means of two bearings. The bearings will have their own lubricant compartment, for example a grease compartment, and will be sealed such to avoid that grease can leak away and prevent ingress from dirt and dust on the rim side. Examples of suitable bearings arrangements are angular contact ball bearings in O-configuration, tapered roller bearings, internally preloaded bearings or a combination of locating and non-locating bearings.

In a second preferred embodiment the first part of the hub carrier is a spindle having an axial channel. The wheel hub shaft is a half shaft having an inner part and a radially extending outer flange as an outer end. The half shaft and the radially extending flange may be made as one part or as an assembly of two parts. The inner part of the half shaft is present in the axial channel and connects by means of a spline connection to the second part of the rotary assembly. Alternatively the rotor shaft and the half shaft may be one part wherein the outer end of this combined part is connected to the radially extending flange, for example by means of a spline connection. The outer flange of the half shaft is mounted to the hub. The hub comprises the rim flange and is rotatably supported by a radially outer part of the spindle. The hub is preferably rotatably supported by so-called outer ring rotating bearings. Such a configuration including a half shaft and a hub, supported by means of outer ring rotating bearings, is a well-known configuration for drive axles of trucks and for that reason a preferred embodiment because it involves even less alterations from the known situation.

In the above embodiment it is preferred that the second part of the rotary assembly comprises of a rotor shaft. The rotor shaft is axially connected by means of a spline connection to the inner part of the half shaft at an outer end of the rotor shaft. The rotor shaft is further connected to the rotor. Preferably the rotor shaft is provided with a radially extending part at its inner end. The radially extending part may comprise the rotor or connects to the rotor. For example the rotor can be bolted to the radially extending part of the rotor shaft. The rotor shaft is rotatably supported by the second part of the hub carrier, preferably supported by two bearings or by a combination of a locating bearing and one or more floating bearings.

The axle bridge structure of the truck axle may be any structure which can connect the two hub-carriers and can connect the truck axle to the chassis frame of a truck. Preferably the bearing centre axis of the truck axle runs below the chassis frame of the truck. A preferred axle bridge structure are two separate and parallel oriented beams which run laterally and perpendicular with respect to the chassis beams of the chassis frame. The lateral beams of the axle bridge run at about the same height as the bearing centre axis. The ends of the lateral beams are connected to the exterior of the second part of the hub carriers, wherein a front lateral beam is connected to the front end of the second part of the hub carrier and a rear lateral beam is connected to the rear end of the second part of the hub carrier. The axle bridge is thus not an inverted portal axle wherein the axle bridge structure is radially spaced apart from the common axis for creating a space for a low floor when the axle is used in a low floor bus.

The truck axle according the invention is suitably mounted as a drive axle to a truck chassis structure using the well known 4-rod configuration.

The 4-rod configuration suitably has two upper v-rods and two lower longitudinal rods. Preferably the axle bridge is configured at its upper end to connect to the two upper v-rods. Preferably the two lateral beams of the axle bridge are connected at a position between the two hub carriers with a structural element, which structural element is configured to connect to the two upper V-rods of a 4-rod configuration to form a roll centre. When the truck axle is mounted to the truck chassis frame it is preferred that the roll centre is at substantially the same elevation as an upper end of the second part exterior part of the hub carrier. With elevation is here meant the vertical distance from a horizontal surface supporting the truck. The lower longitudinal rods may be connected to the lower end of the axle bridge by means of a suitable bracket and strut, which strut is bolted or riveted to the chassis beams of the chassis frame.

The lateral beams of the axle bridge are preferably provided with a horizontal surface to support at least two air springs per lateral beam.

The invention is also directed to a truck having a truck axle according to this invention, wherein the truck axle is mounted to a truck chassis structure of the truck. The truck is preferably comprises two axles according to this invention and one axle comprising steerable wheels. This configuration is also known as the earlier referred to 6×4 configuration. The four direct drive electric motor wheels will provide the required torque for the heavy load applications. When lower loads are possible a truck may be preferred having one axle according to this invention and at least one axle comprising steerable wheels. Optionally a dead axle may be present in such a truck. By dead axle is meant an axle which provides support but does not provide movement power. The dead axle may have steerable wheels.

A preferred truck has an axle according to this invention connected to the two chassis beams of the truck chassis frame by at least (i) a 4-rod configuration consisting of two v-rods connected to roll centre of the structural element and two lower longitudinal rods connected to the axle bridge structure, (ii) springs, such as air springs, located between the lateral beams and the axle bridge structure (4), (iii) more than one dampers and (iv) an anti-roll bar.

EXAMPLE

The torque that can be achieved using a hub carrier according to the invention, Design A, as shown in FIG. 2 and the torque of a Prior art hub carrier according to FIG. 1 of US2019/0023118 are compared in this example. The dimensions for both designs are listed in the below table. In the comparison the air gap area is kept the same and thus also the amount of copper and neodymium is about the same for both designs.

|  | Design A | Prior art |
|---|---|---|
| Air gap diameter (mm) | 577 | 432 |
| Air gap radius (mm) | 288.5 | 216 |
| Stack length (mm) | 266 | 356 |
| Air gap area (cm2) | 4829 | 4829 |
| Cooling area (cm2) | 5679 | 3520 |

The tangential airgap force will be similar in both designs because of their similar air gap area. In the design of the invention the tangential force works at a larger radius resulting in a torque that is higher by a factor 288.5/216=1.335. Further the cooling area is larger for the Design A by a factor 5679/3520=1.61. Torque is proportional to current and heat losses are proportional to current square. Thus for a design having a cooling area which is a factor 1.61 larger, it is possible to run a current that is sqrt 1.61=1.27 times larger at the same working temperatures as compared to the prior art design. Thus the possible larger torque of Design A according to the invention is calculated by multiplying the geometry factor of 1.335 by the thermal factor of 1.27 resulting in an overall advantage of 1.7 (70% improvement).

The above calculation shows that a direct drive wheel hub according to this invention having the same amount of copper and neodymium can provide 70% more continuous torque than the prior art direct drive design and can be used as part of a drive axle of a truck.

The invention shall be illustrated by the following FIGS. 1-12:

Figure 3:
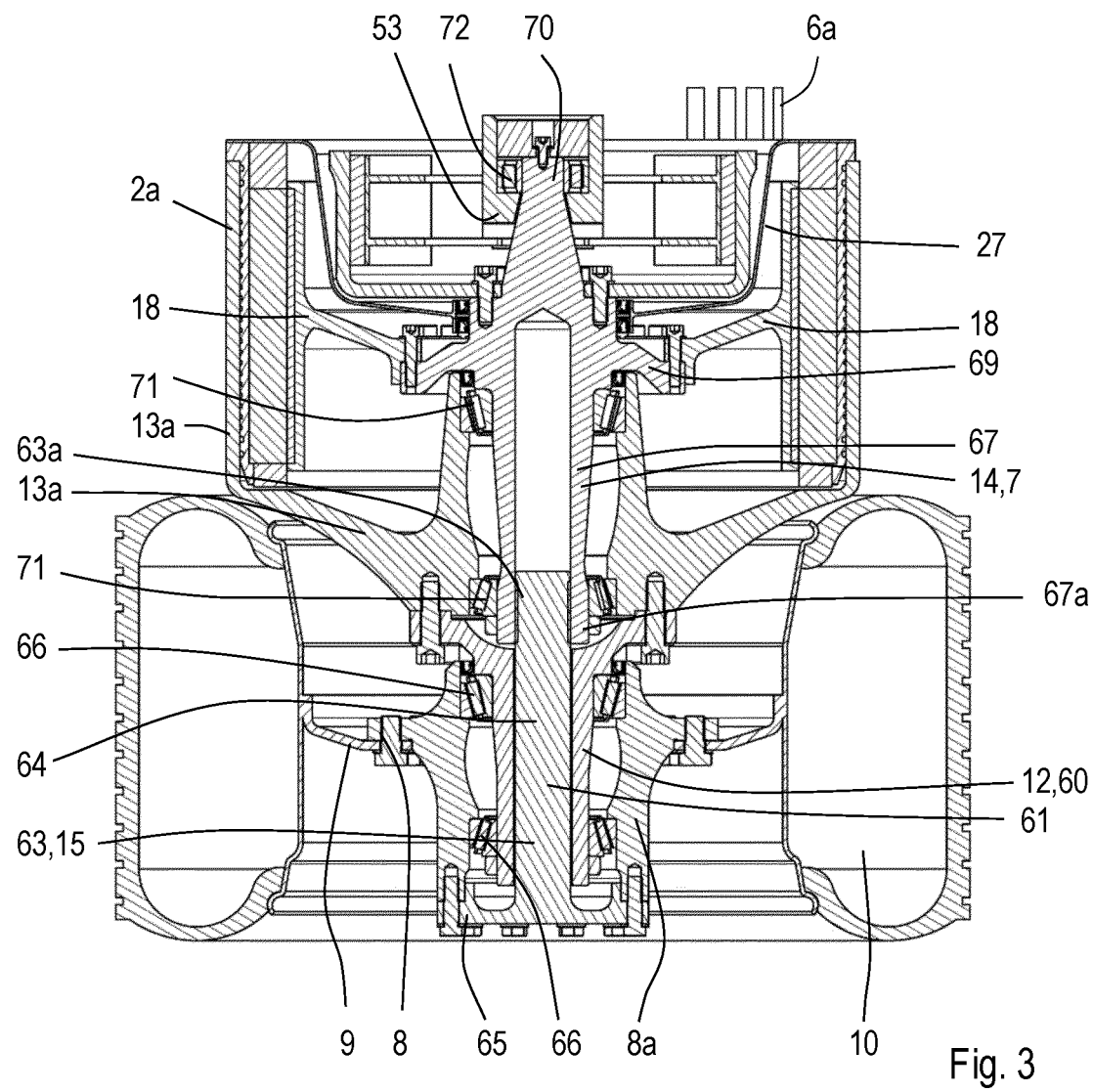
Figure 4:
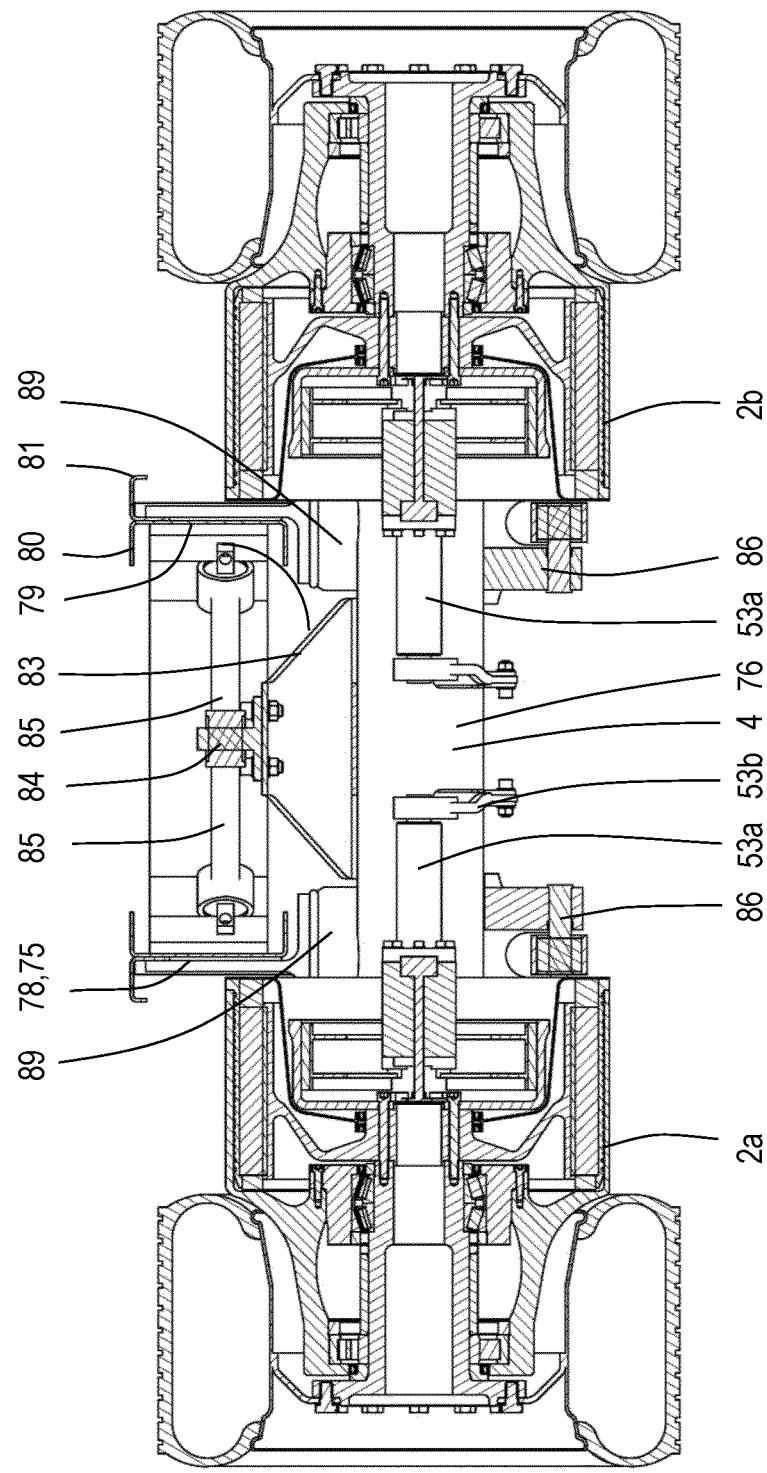

FIG. 3 sho ws a second variant of a hub carrier. FIG. 4 shows a vertical cross-sectional view of a truck axle. Figures S and 6 show the truck axle (1) and part of the truck chassis of FIG. 4 from below under an angle.

Figure 7:
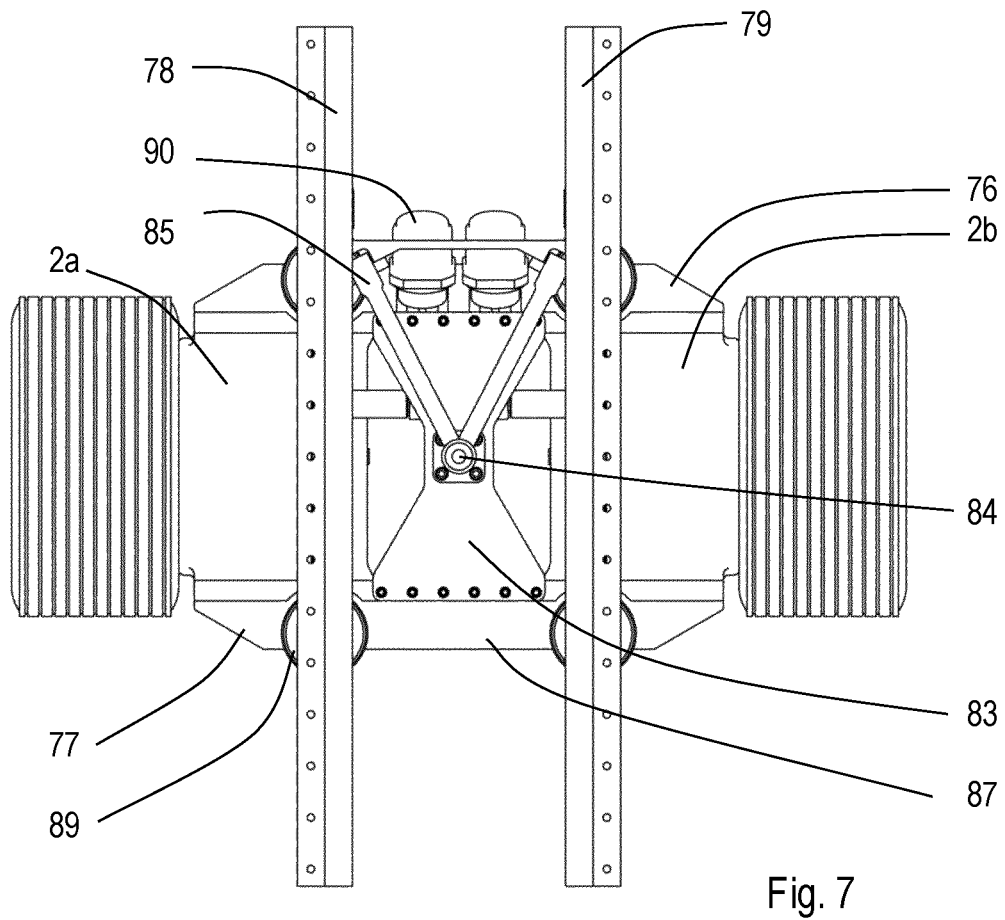
Figure 8:
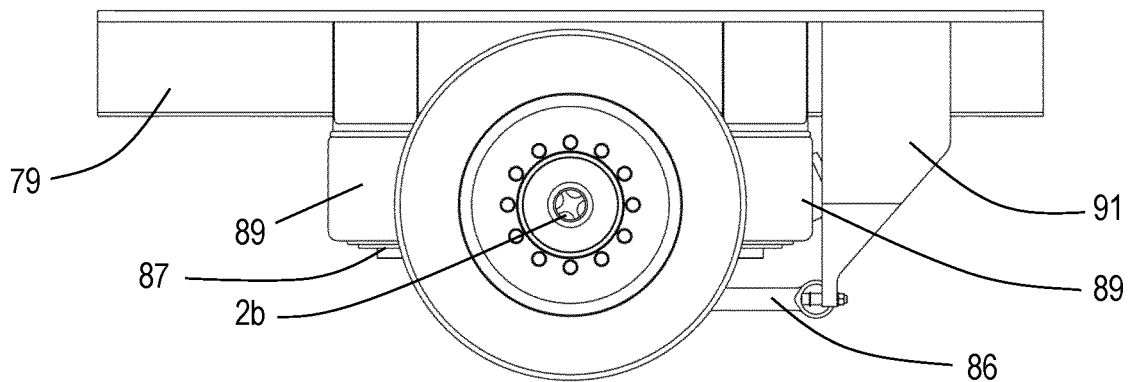

FIG. 7 shows the truck axle and part of the truck chassi s of FIG. 4 from aboy FIG. 8 shows the truck axle and part of the truck chassis of FIG. 4 from aside.

Figure 9:
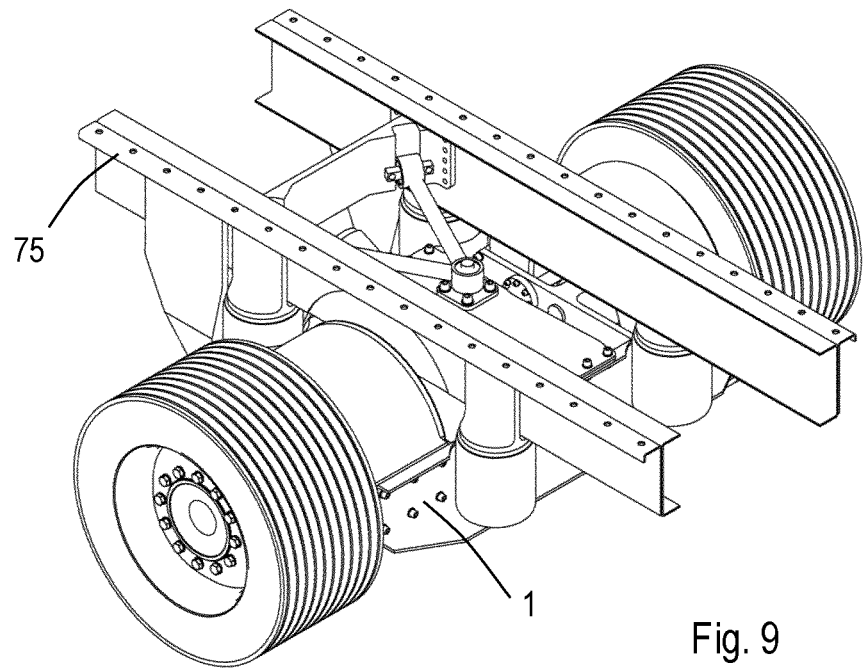

FIG. 9 shows the truck axle and part of the truck chassis of FIG. 4 from above suited for the so-called 6x4 configuration.

Figure 5:
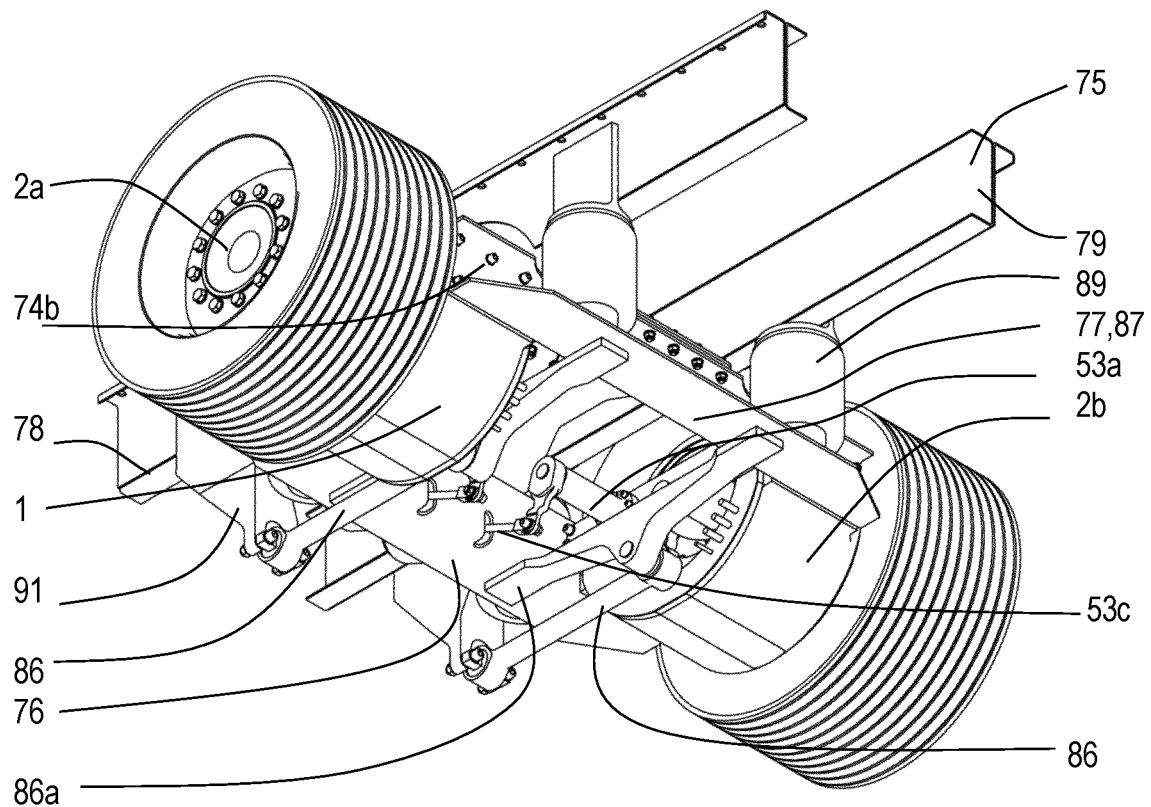
Figure 6:
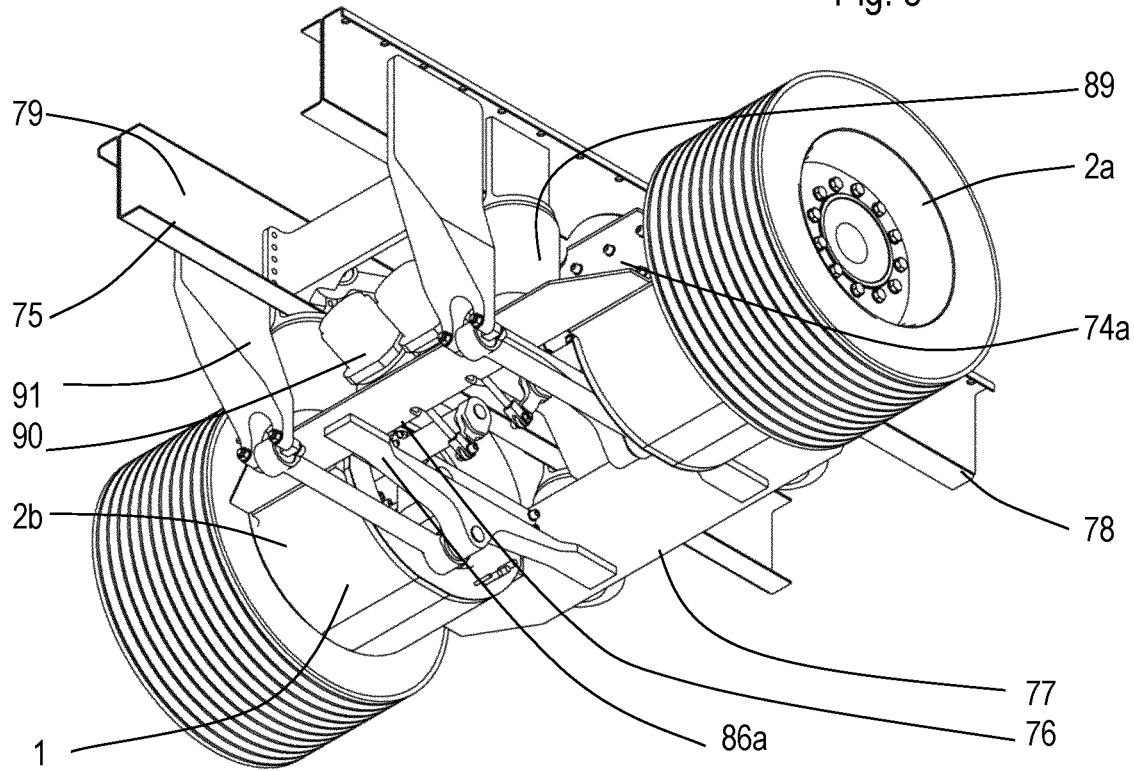
Figure 10:
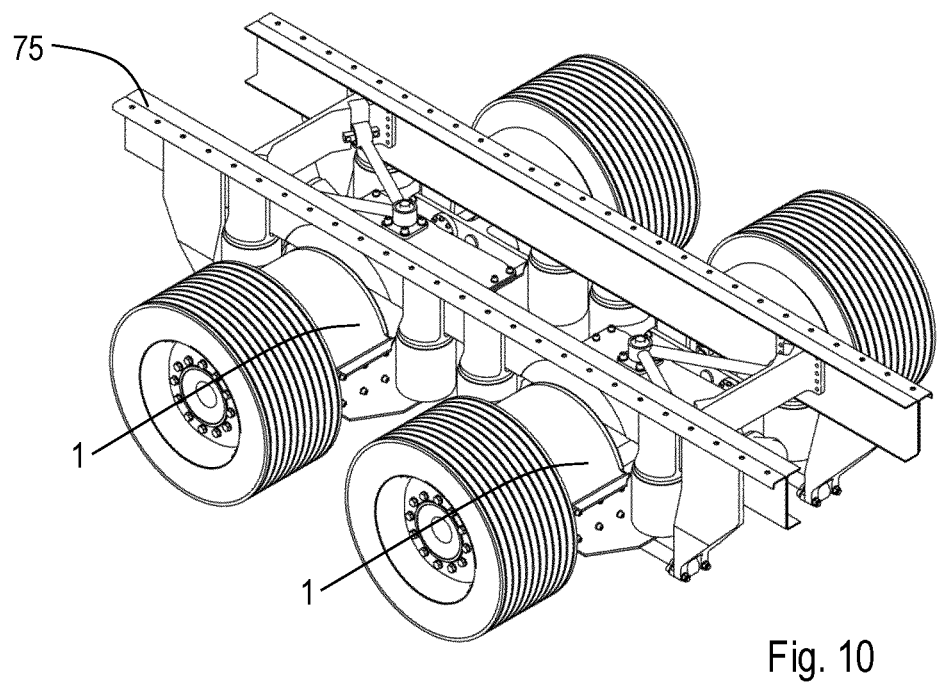

FIG. 10 shows part of a truck chassis provided with two truck axles (1) according to FIGS. 4-6 suited for the 6x4 configuration.

Figure 11:
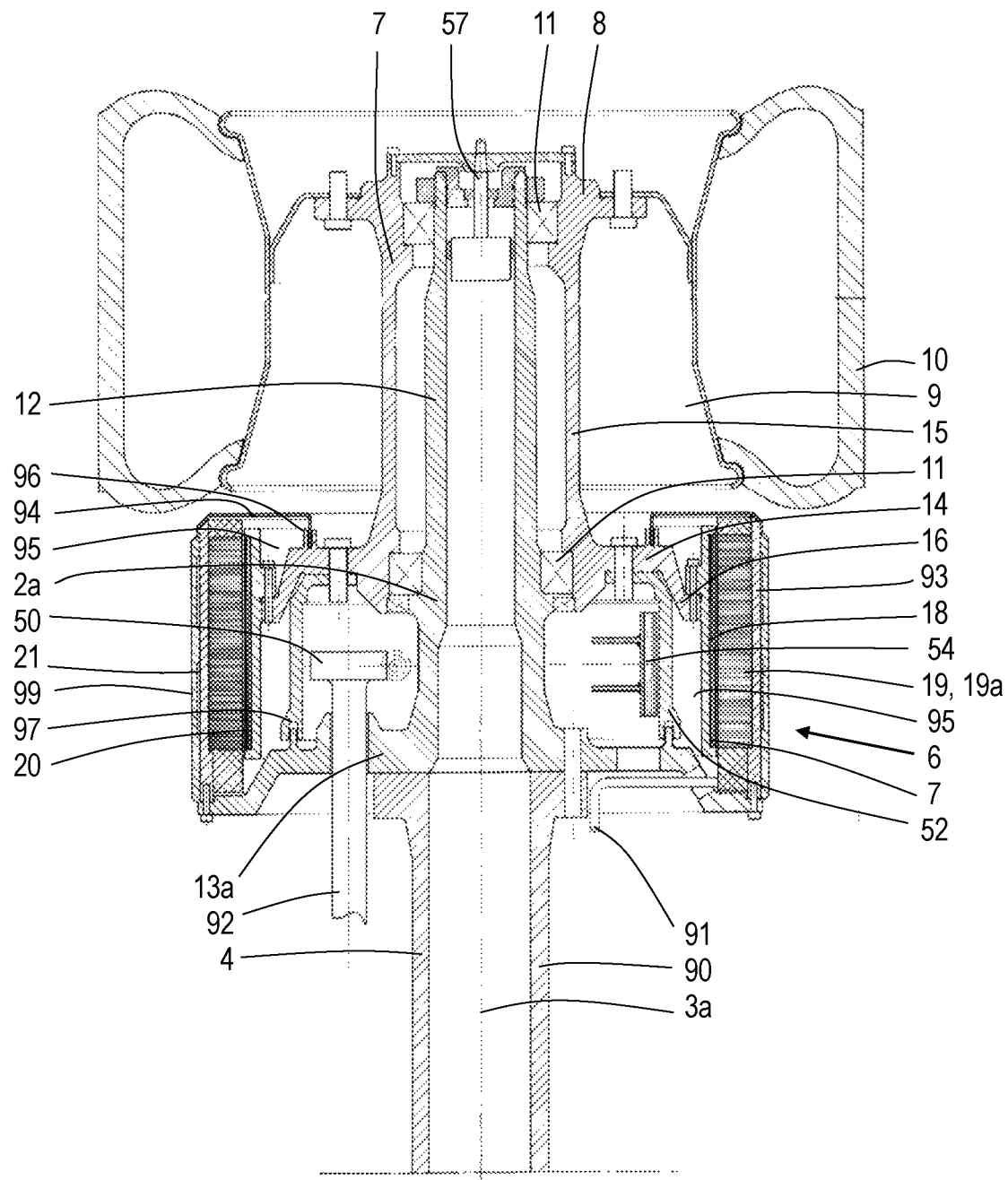

FIG. 11 shows a third variant of hub carrier and part of an axle bridge

Figure 12:
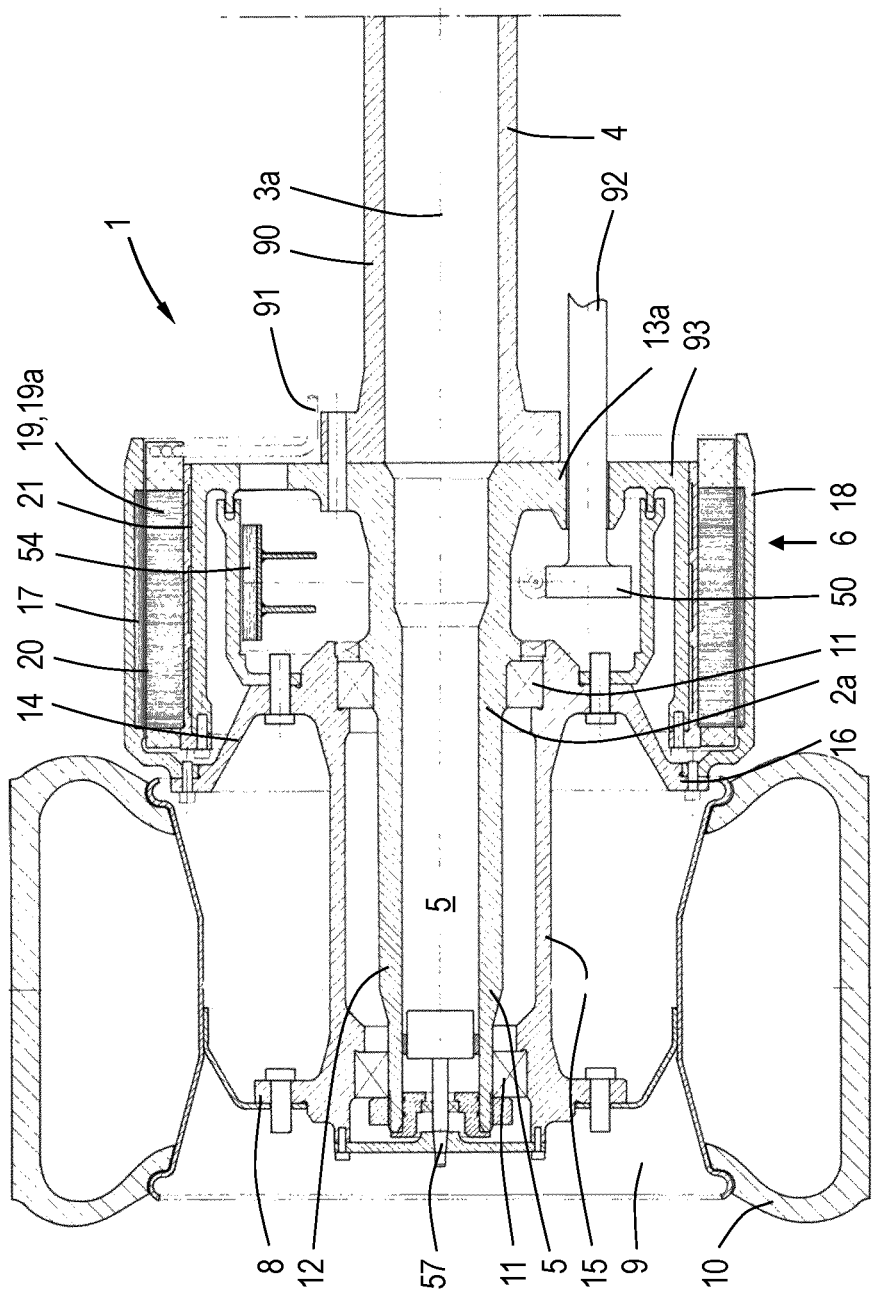

FIG. 12 shows a fourth variant of a hub carrier and part of an axle bridge.

Figure 1:
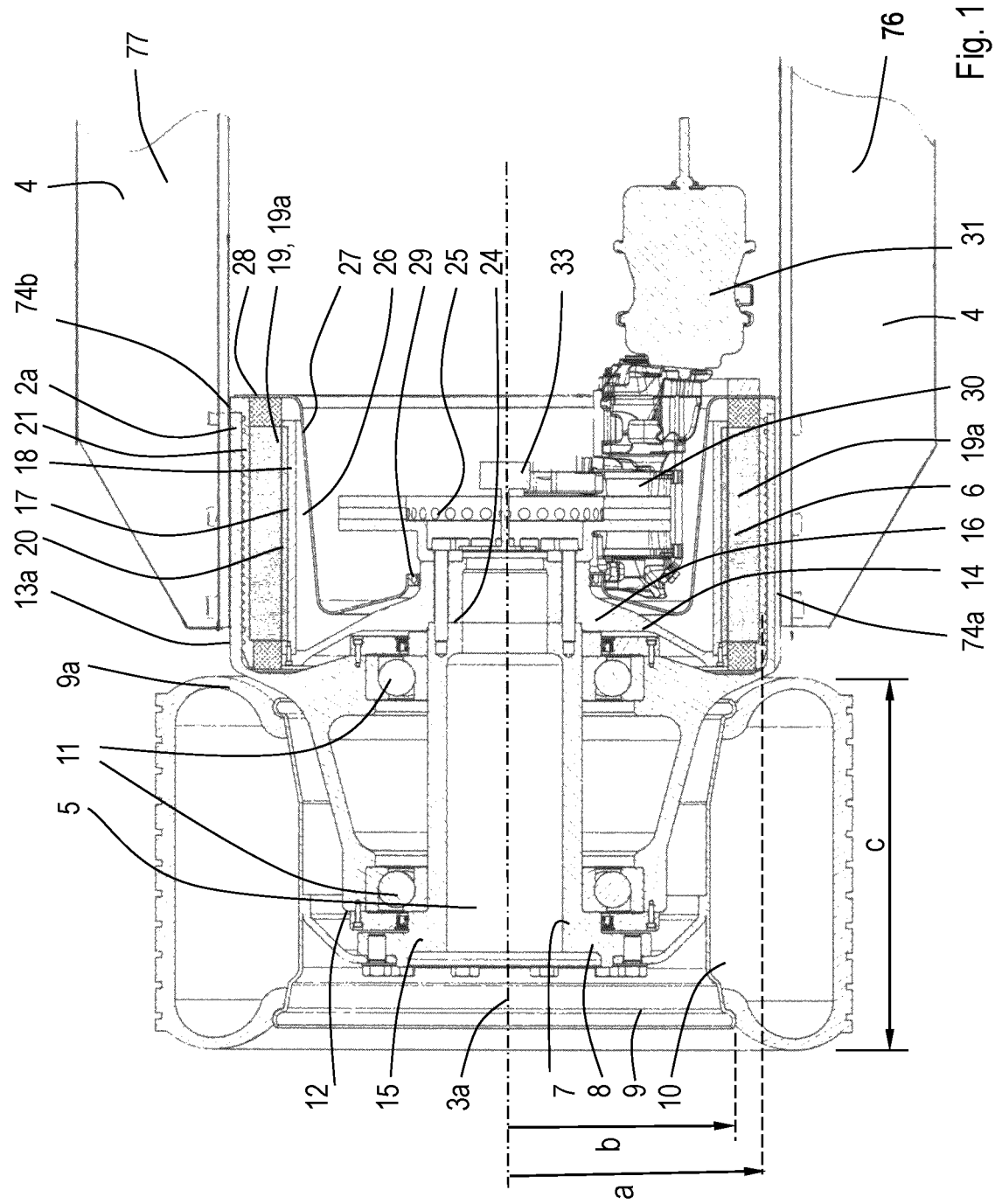
FIG. 1 shows a first variant of a hub carrier and part of an axle bridge.

FIG. 1 shows a first variant of a hub carrier (2a) and part of an axle bridge (4) in a horizontal cross-section as seen from above. Hub carrier (2a) comprises a stator (19) of a direct drive electric torque motor (6) and carries a rotary assembly (7) comprising a rim flange (8) supporting a rim (9) and a super single tyre (10) combination. The wheel hub shaft (15) of the rotary assembly (7) is rotatably positioned within an axial channel (5) as present in the hub carrier (2a) by two angular contact ball bearings in O-configuration (11). Between the bearings (11) a grease or lubricant compartment is present and two seals enclose the space for the grease.

The hub carrier (2a) comprises of a first part (12) which is laterally positioned within the rim (9) and super single tyre (10) combination and a second part (13a) which is laterally positioned next to the rim (9) and tyre (10) combination. To the exterior of second part (13a) at a forward point (74a) and at a backward point (74b) beams (76,77) of an axle bridge (4) are connected.

Rotary assembly (7) is comprised of a wheel hub shaft (15) which is laterally positioned within the rim (9) and tyre (10) combination and a second part (14) which is laterally positioned next to the rim (9) and tyre (10) combination.

Second part (14) of the rotary assembly (7) comprises of a steel rotor tube (18) bolted to a rotor flange (16). The steel rotor tube (18) carries permanent magnets (17) of the electric torque motor (6). The permanent magnets (17) of the rotor are positioned at the external side of the steel rotor tube (18).

The second part (13a) of the hub carrier (2a) comprises of a stator (19) of the electric torque motor (6). Tubular stator (19) has a tubular lamination stack (19a). The stator (19) has a tubular shape as positioned at the radially inner side of a load bearing housing of the second part (13a,13b) of the hub carrier (2a,2b,49). and wherein the outer diameter (a) of the lamination stack (19a) is more than 90% of the largest diameter (b) of the rim (9). The outer diameter (a) of the tubular lamination stack (19a) is larger than the largest diameter (b) of the rim (9) in FIG. 2. Between the tubular stator (19) and the steel rotor tube (18) a tubular shaped air gap (20) is present. Cooling channels (21) are present between the external side of the stator (19) and the load bearing housing of the second part (13a) of the hub carrier (2a).

Rotor flange (16) is connected to a wheel hub shaft (15) which may laterally extend somewhat from within the rim and tyre combination as shown. Wheel hub shaft (15) runs from the rim flange (8) for its main part within the rim (9) and single tyre (10) combination to an opposite axial end (24). Opposite axial end (24) is axially positioned within the electric torque motor (6). At this axial end (24) the rotor flange (16) and a brake disc (25) is bolted on the wheel hub shaft (15). Alternatively rotor tube (18) and rotor flange (16) may be a single part. The steel rotor tube (18) and the rotor flange (16) rotate within a sealed space (26). Sealed space (26) is enclosed within the hub carrier (2a) by a seal carrier (27). This seal carrier (27) separates sealed space (26) from an outside environment in which the brake disc (25) is present. This seal carrier (27) runs from an axially inner end (28) of the second part (13a) of hub carrier (2a) to a central opening allowing passage of the rotor flange (16). At this opening a seal (29) is present.

The brake disc (25) is provided with a brake calliper (30). The brake calliper (30) is operated by a brake actuator (31). The brake calliper (30) is mounted on the second part of the hub carrier (13a) by means of a brake carrier (not shown). The position of the brake calliper is chosen such that it can be positioned more or less at the same height as the common axis of the two hub carriers and in between two lateral beams that connect hub carrier 13a and hub carrier 13b.

Figure 2:
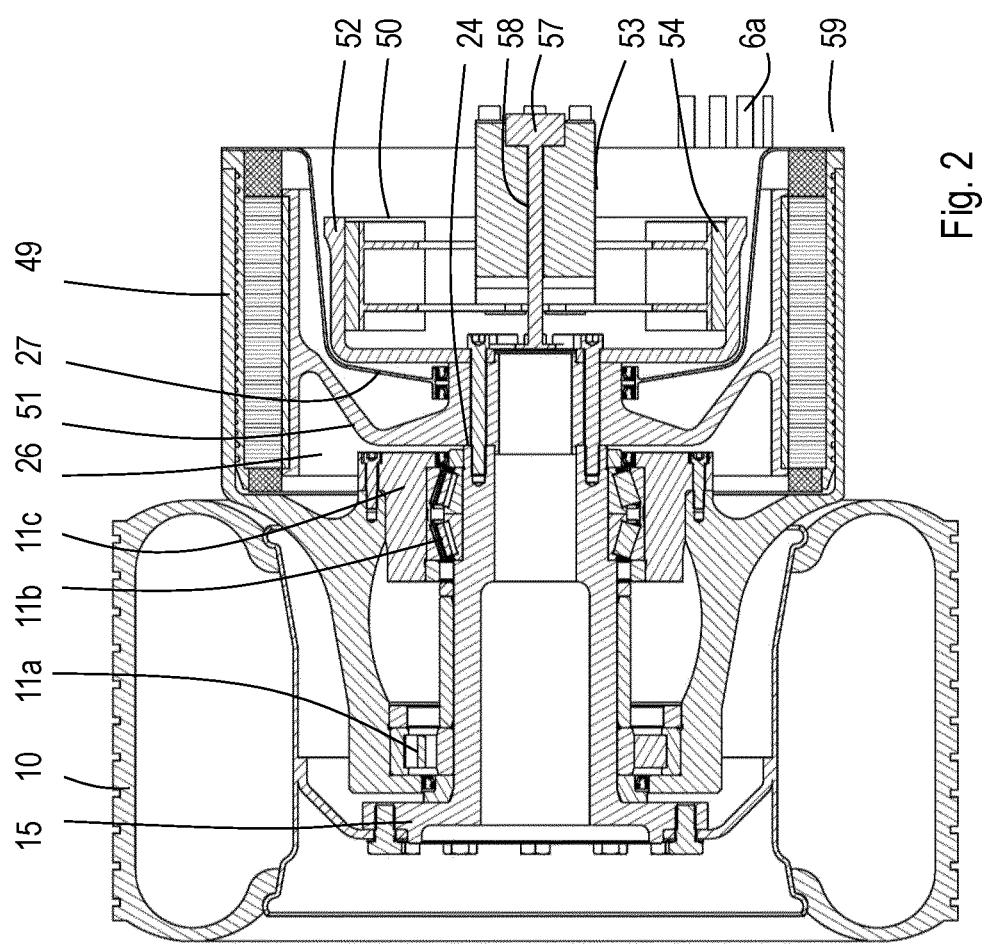
FIG. 2 shows a hub carrier of FIG. 1 with a drum brake.

The tyres (10) as shown in all figures are in their most compressed condition, both in width and in diameter. The hub carrier as shown is made of one single part. Obviously it may be a bolted assembly of two or more parts. This loaded width (c) is shown in FIG. 2. The nominal width will be smaller. As shown the gap between tyre side wall (9a) and the second part (13a,13b) of the hub carrier is just sufficient to avoid contact between the tyre side wall (9a) and the hub carrier (13a) in case of maximum compression of the tyre (9).

FIG. 2 shows a hub carrier (49) as in FIG. 1 except that the brake disc (25) and brake calliper (30) of FIG. 1 are replaced by a drum brake (50). Further the rotor flange (16) and steel rotor tube (18) are combined into a single part (51). The drum brake (50) comprises a brake drum (52) and brake shoes (54). The second part (14) of the rotary assembly carries the brake drum (52) and the brake carrier (53) carries the brake shoes (54). In FIG. 2 at axial end (24) of wheel hub shaft (15) the single part rotor (51) and a brake drum (52) are bolted on the wheel hub shaft (15). A drum brake carrier (53) is present to which the brake shoes (54) are mounted on anchor pins and operated by a S-camshaft. A seal carrier (27) separates the sealed space (26) from an outside environment in which the drum brake (50) is present. Further a rotational position transducer (57) is shown, that is driven by a short shaft (58), which mounts to the inside of the brake drum (52) by means of a flange.

Further in FIG. 2 the two angular contact ball bearings have been replaced by a locating bearing (11b) on the inner side, which is a double row tapered roller bearing, and a non-locating bearing (11a) on the outer end which is a cylindrical roller bearing. This facilitates a very smooth transition between the cylindrical part of the wheel hub shaft (15) and the rim flange (8), resulting in very low material stresses under use. The double row tapered roller bearing (11b) is pre-assembled in a separate housing (11c) This facilitates the manufacturing of the hub carrier, especially if this would be a single piece casting or forging, and installation is simplified because there is no need to adjust the bearing play. The advantage of a locating and non-locating bearing is further that thermal expansion of the hub carrier does not significantly change the bearing play or preload. Electrical wiring (6a) is shown to connect the direct drive electric torque motor (6) with a power supply.

FIG. 3 shows a second variant of hub carrier (2) similar to FIGS. 1 and 2 except in that the first part (12) of the hub carrier (2) is a spindle (60) having an axial channel (61). The wheel hub shaft (15) is a half shaft (63) having an inner part (64) and a radially extending outer flange (65) as an outer end. The inner part (64) of the half shaft (63) is present in the axial channel (61) and connects to the second part (14) of the rotary assembly (7) by means of a spline connection (63a). Hub (8a), that comprises rim flange (8) is rotatably supported by two outer ring rotating bearings (66) as present on the radially outer part of the spindle (60). The second part (14) of the rotary assembly (7) comprises of a rotor shaft (67). Rotor shaft (67) is axially connected to the inner part (64) of the half shaft (63) at an outer end (67a) of the rotor shaft (67) by means of the spline connection (63a). The rotor shaft (67) is provided with a radially extending flange (69) to which rotor (18) is connected. The rotor shaft (67) is rotatably supported inside the second part (13a) of the hub carrier (2a,2b) by two tapered roller bearings (71) and a cylindrical roller bearing (72) as present at the most inner end (70) of the rotor shaft (67). Preferably this most inner end (70) of the rotor shaft (67) is positioned in the brake carrier (53) of a preferred drum brake. A seal carrier with a double seal (27) is shown. The outer flange (65) of the half shaft (61) mounts to the hub (8a) such that the rotation of the rotor shaft (67) is transmitted to the hub (8a)

The invention is for this reason also directed to a hub carrier as shown in FIG. 3. This hub carrier comprises a stator of a direct drive electric motor and carries a rotary assembly comprising a hub,
wherein the hub comprises a rim flange to support a rim for a single tyre,
wherein the hub carrier comprises of a first part which is laterally positioned within the rim and tyre combination when mounted and a second part which is laterally positioned next to the rim and tyre combination when mounted;
wherein the rotary assembly is comprised of a wheel hub shaft which is laterally positioned within the rim and tyre combination when mounted and a second part which is laterally positioned next to the rim and tyre combination when mounted; and
wherein the second part of the hub carrier comprises the stator of the electric motor and the second part of the rotary assembly comprises a rotor of the electric motor,
wherein the first part of the hub carrier (2a,2b) is a spindle having an axial channel, the wheel hub shaft is a half shaft having an inner part provided with outer splines and a radially extending outer flange as an outer end,
wherein the hub is rotatably supported by a radially outer part of the spindle, and
wherein the inner part of the half shaft is present in the axial channel and connects to the second part of the rotary assembly by means of a spline connection and wherein the outer flange of the half shaft is mounted to the hub such that the rotation of the second part of the rotary assembly is transmitted to the hub by means of the half shaft.

Preferably the second part of the rotary assembly comprises of a rotor shaft which rotor shaft is axially connected to the inner part of the half shaft at an outer end of the rotor shaft and provided with a radially extending part at its inner end which radially extending part comprises the rotor or connects to the rotor and wherein the rotor shaft is rotatably supported by the second part of the hub carrier.

Preferably the rotor shaft is rotating in three bearing. The three bearings are suitably two tapered roller bearings and one cylindrical roller bearing positioned at the most inner end of the rotor shaft. Preferably this most inner end of the rotor shaft is positioned in the brake carrier of a preferred drum brake. The additional third bearing at this end may be omitted. When present the critical speed of the rotor shaft can be higher. The two tapered roller bearings may be combined into one single double-row bearing. In that case the third bearing is present.

The above hub carrier may be integrated into an axle for any vehicle such as a truck or a bus, especially a low floor bus.

The terms used for the above hub carrier have the same meaning as the terms used for the truck axle and the preferred embodiments of the truck axle also apply for this hub carrier.

FIGS. 1-3 show that the second part (13a,13b) or motor housing includes the stator (18) of the motor, and may provide mounting points for a brake carrier (53), that provides mounting points for a disc brake calliper (30) or brake shoe anchor points and a drum brake S-camshaft for a drum brake. The motor housing also provides mounting points for the axle bridge structure as will be shown in FIGS. 4 and 5.

FIG. 4 shows a vertical cross-sectional view of a truck axle (1) provided with two hub carriers (2a,2b) according to FIG. 2 as attached to a truck chassis as seen from behind. The bearing centre axes (3a,3b) are positioned on a common axis, that runs below the chassis frame (75) of the truck. The second part (13a) of the hub carrier (2a) is connected to the second part (13b) of the hub carrier (2b) by two lateral beams (76,77) of the axle bridge structure (4) of which the front lateral beam (76) is shown. The lateral beam (76) runs perpendicular with respect to the chassis beams (78,79) of the chassis frame (75). The bearing centre axis (3) of the truck axle runs below the chassis frame (75) of the truck. These figures illustrate how the truck axle can be position relative to a typical chassis frame (75) of a truck. The chassis beams (78,79) of the chassis frame (75) are comprised of a U-profile beam as positioned as an inner beam part (80) bolted to an outer beam part (81). The height of the upper end of the two parallel chassis beams (78,79) is greater than the height of the upper end of the second part (13a,13b) as shown.

The two beams (76,77) of the axle bridge (4) are connected at a position between the two hub carriers (2a,2b) with a structural element (83). The structural element (83) is composed of a metal plate having two upward tilted surfaces and a horizontal surface as an upper end. At the upper end in a central position a roll centre (84) is present on the structural element (83). Two V-rods (85) of a 4-rod configuration connect the axle bridge (4) with the chassis beams (78,79) of the chassis frame (75). The roll centre (84) is positioned at substantially the same elevation as an upper end of the exterior part (13a,13b) of the hub carriers (2a,2b). Two lower longitudinal rod (86) are shown of the 4-rod configuration which connects the lower end of the axle bridge (4) with chassis beams (78,79) of the chassis frame (75). Air springs (89) are shown. Further S-camshaft bearing housings (53a) and slack adjuster (53b) are shown.

FIGS. 5 and 6 show the truck axle (1) and part of the truck chassis (75) of FIG. 4 from below under an angle. The axle bridge (4) consists of a front lateral beam (76) and a rear lateral beam (77) as connected to the exterior of the second part (13) of the hub carrier (2a). The front lateral beam (76) is mounted at or close to the forward point (74a) of the circumference of the exterior of the second part (13) of the hub carrier. The rear lateral beam (77) is mounted at or close to the backward point (74b) of the circumference of the exterior of the second part (13) of the hub carrier. The two separate and parallel oriented beams (76,77) run perpendicular with respect to the chassis beams (78,79) of the chassis frame (75). In these figures it is shown how the two lower longitudinal rods (86) connect to the lower end of the axle bridge (4) by means of a bridging part (86a) which connect the two lateral beams (76,77). Via a longitudinal rod chassis bracket (91) each of the two lower longitudinal rods (86) are connected to the chassis beams (78,79) respectively. Further it shows how brake actuation push rods (53c) pass through the front lateral beam (76) to connect to brake actuators (90). The lateral beams (76,77) have a horizontal surface (87) to support air spring (89).

FIG. 7 shows the truck axle (1) and part of the truck chassis (75) of FIG. 4 from above.

FIG. 8 shows the truck axle (1) and part of the truck chassis (75) of FIG. 4 from aside.

FIG. 9 shows the truck axle (1) and part of the truck chassis (75) of FIG. 4 from above under an angle suited for the so-called 4×2 or 6×2 configuration FIG. 10 shows part of a truck chassis (75) provided with two truck axles (1) according to FIGS. 4-6 suited for the so-called 6×4 configuration.

FIG. 11 shows a third variant of hub carrier (2a) and part of an axle bridge (4) in a horizontal cross-section as seen from above. The reference numbers not described here have the same meaning as in FIGS. 1-10. The hub carrier (2a) carries a rotary assembly (7) comprising a rim flange (8) supporting a rim (9) and a super single tyre (10) combination.

The hub carrier (2a) comprises of a first part (12) which is laterally positioned within the rim (9) and super single tyre (10) combination and a second part (13a) which is laterally positioned next to the rim (9) and tyre (10) combination. The second part (13a) of hub carrier (2a) comprises a stator (19) of a direct drive electric torque motor (6). Second part (13a) is connected to the second part (13b) of the opposite hub carrier (2b) of the axle by means of an axle part (90) as the axle bridge (4) which axle part (90) runs along axis (3a). Axle part (90) is bolted to both second part (13a) and second part (13b) of hubs (2a) and (2b) respectively.

Rotary assembly (7) is comprised of a wheel hub shaft (15) which is laterally positioned within the rim (9) and tyre (10) combination and a second part (14) which is laterally positioned next to the rim (9) and tyre (10) combination. The wheel hub shaft (15) of the rotary assembly (7) is rotatably positioned around the first part (12) of hub carrier (2a). The wheel hub shaft (15) is supported by two outer ring rotating tapered roller bearings (11) in O-configuration.

Second part (14) of the rotary assembly (7) comprises of a steel rotor tube (18) bolted to a rotor flange (16). The steel rotor tube (18) carries permanent magnets (17) of the electric torque motor (6). The permanent magnets (17) of the rotor are positioned at the outer side of the steel rotor tube (18).

The second part (13a) of the hub carrier (2a) comprises of a stator (19) of the electric torque motor (6). Tubular stator (19) has a tubular lamination stack (19a). The stator (19) has a tubular shape as positioned at the radially inner side of a stator carrier (93) as part of the second part (13a,13b) of the hub carrier (2a,2b). Between the tubular stator (19) and the magnets (17) a tubular shaped air gap (20) is present. Cooling channels (21) are present as part of a cooling sleeve (99) at the radially outer side of the stator (19) as mounted around the stator carrier (93). The stator carrier (93) further comprises an enclosing wall part (94) facing the rim (9) to enclose a space (95) in which the second part (14) of the rotary assembly (7) can rotate. The wall part (94) and the second part (14) are rotably connected by a labyrinth seal (96). A second labyrinth seal (97) is present between brake drum (52) and the wheel hub carrier second part (13a). Labyrinth seals (96) and (97) ensure that ingress of dirt and brake dust to the stator and rotor is avoided.

FIG. 11 further shows a drum brake (50), a S-camshaft (92) and brake shoes (54). Further power wires (91) are shown.

FIG. 12 shows a fourth variant of hub carrier (2a) and part of an axle bridge (4) in a horizontal cross-section as seen from above. The reference numbers not described here have the same meaning as in FIGS. 1-11. Hub carrier (2a) comprises a stator (19) of a direct drive electric torque motor (6) and carries a rotary assembly (7) comprising a rim flange (8) supporting a rim (9) and a super single tyre (10) combination.

The hub carrier (2a) comprises of a first part (12) which is laterally positioned within the rim (9) and super single tyre (10) combination and a second part (13a) which is laterally positioned next to the rim (9) and tyre (10) combination. Second part (13a) is connected to the second part (13b) of the opposite hub carrier (2b) of the axle by means of an axle part (90) as the axle bridge (4) which axle part (90) runs along axis (3a). Axle part (90) is bolted to both second part (13a) and second part (13b) of hubs (2a) and (2b) respectively.

Rotary assembly (7) is comprised of a wheel hub shaft (15) which is laterally positioned within the rim (9) and tyre (10) combination and a second part (14) which is laterally positioned next to the rim (9) and tyre (10) combination. The wheel hub shaft (15) of the rotary assembly (7) is rotatably positioned around the first part (12) of hub carrier (2a). The wheel hub shaft (15) is supported by two tapered roller bearings in 0-configuration (11).

Second part (14) of the rotary assembly (7) comprises of a steel rotor tube (18) bolted to a rotor flange (16). The steel rotor tube (18) carries permanent magnets (17) of the electric torque motor (6). The permanent magnets (17) of the rotor are positioned at the radially inner side of the steel rotor tube (18). The radially outer tubular side of steel rotor tube (18) is visible.

The second part (13a) of the hub carrier (2a) comprises of a stator (19) of the electric torque motor (6). Tubular stator (19) has a tubular lamination stack (19a). The stator (19) has a tubular shape as positioned at the outer side of a stator carrier (93) as part of the second part (13a,13b) of the hub carrier (2a,2b,49). Between the tubular stator (19) and the magnets (17) a tubular shaped air gap (20) is present. Cooling channels (21) are present between the radially inner side of the stator (19) and the radially outer side of the stator carrier (18).

FIG. 12 further shows a drum brake (50), a S-camshaft (92) and brake shoes (54). Further power wires (91) are shown.

The invention claimed is:

1. A truck axle comprising two hub carriers having a bearing centre axis, which bearing centre axes are positioned on a common axis and wherein the two hub carriers are connected by an axle bridge structure,
    wherein each hub carrier comprises a stator of a direct drive electric motor and carries a rotary assembly comprising a rim flange to support a rim for a single tyre,
    wherein the hub carrier comprises of a first part which is laterally positioned within the rim and tyre combination when mounted and a second part which is laterally positioned next to the rim and tyre combination when mounted;
    wherein the second part of one hub carrier is connected to the second part of the other hub carrier by the axle bridge structure;
    wherein the rotary assembly is comprised of a wheel hub shaft and a second part which is laterally positioned next to the rim and tyre combination when mounted;
    wherein the second part of the hub carrier comprises the stator of the electric motor and the second part of the rotary assembly comprises a rotor of the electric motor.

2. An axle according to claim 1, wherein the rim flange of the rotary assembly supports a rim and a single tyre.

3. A truck axle according to claim 2, wherein the tyre is a super single tyre.

4. A truck axle according to claim 2, wherein the tyre has a nominal width of less than 500 mm.

5. A truck axle according to claim 1, wherein the second part of the rotary assembly carries a brake disc further provided with a brake calliper.

6. A truck axle according to claim 1, wherein the second part of the rotary assembly carries a brake drum and wherein one or more brake shoes are carried by a brake carrier.

7. A truck axle according to claim 1, wherein the stator is of the concentrated winding type.

8. A truck axle according to claim 1, wherein the direct drive electric motor is a direct drive electric torque motor and wherein the rotor comprises permanent magnets.

9. A truck axle according to claim 1, wherein the direct drive electric motor is a high rotor pole switched reluctance machine and wherein the rotor comprises a plurality of rotor poles.

10. A truck axle according to claim 1, wherein the rotary assembly is rotatably positioned within an axial channel as present in the hub carrier by two axially spaced apart bearings.

11. A truck axle according to claim 10, wherein between the axially spaced apart bearings a common lubrication compartment is present and wherein the two bearings and the lubrication compartment is sealed by seals.

12. A truck axle according to claim 10, wherein the stator comprises a lamination stack having a tubular shape as positioned at the inner side of a load bearing housing of the second part of the hub carrier and wherein the outer diameter (a) of the lamination stack is more than 90% of the largest diameter (b) of the rim.

13. A truck axle according to claim 10, wherein the stator comprises a lamination stack having a tubular shape as positioned at the inner side of a load bearing housing of the second part of the hub carrier and wherein cooling channels are present between the lamination stack and the inner side of the load bearing housing.

14. A truck axle according to claim 10, wherein the second part of the hub carrier have an exterior surface and wherein the axle bridge structure is comprised of two lateral parallel beams each connected at their respective ends to the exterior surface of the second parts.

15. A truck axle according to claim 14, wherein the two lateral beams are connected at a position between the two hub carriers with a structural element, which structural element is configured to connect to two V-rods of a 4-rod configuration to form a roll centre.

16. A truck axle according to claim 15, wherein the structural element is configured to connect to two V-rods of a 4-rod configuration to form a roll centre at substantially the same elevation as an upper end of the second part of the hub carriers.

17. A truck axle according to claim 1, wherein the rim flange is part of a hub,
    wherein the first part of the hub carrier is a spindle having an axial channel and a radially outer part,
    wherein the hub is rotatably supported by the radially outer part of the spindle,
    the wheel hub shaft is a half shaft having an inner part and a radially extending outer flange as an outer end, wherein the inner part of the half shaft is present in the axial channel and connects to the second part of the rotary assembly and wherein the outer flange of the half shaft is mounted to the hub such that the rotation of the second part of the rotary assembly is transmitted to the hub by means of the half shaft.

18. A truck axle according to claim 17, wherein the second part of the rotary assembly comprises of a rotor shaft which rotor shaft is axially connected to the inner part of the half shaft at an outer end of the rotor shaft by means of the spline connection and which rotor shaft is provided with a radially extending part at its inner end which radially extending part comprises the rotor or connects to the rotor and wherein the rotor shaft is rotatably supported inside the second part of the hub carrier.

19. A truck axle according to claim 1, wherein the first part and the second part of the hub carriers are load bearing and wherein a second part of one of the hub carriers is connected to the second part of the other hub carrier by an axle bridge and wherein the rotary assembly is rotatably positioned around the hub carrier by outer ring rotating bearings.

20. A truck axle according to claim 19, wherein the stator comprises a lamination stack having a tubular shape as positioned at the radially inner side of a housing of the second part of the hub carrier and wherein the rotor is present at the radially inner side of the stator.

21. A truck axle according to claim 20, wherein at the radially outer side of the stator a cooling sleeve is present.

22. A truck axle according to claim 19, wherein the stator comprises a lamination stack having a tubular shape as positioned at the radially outer side of a housing of the second part of the hub carrier and wherein the rotor is present at the radially outer side of the stator.

23. A truck axle according to claim 1, wherein the outer diameter (a) of the lamination stack is about equal to the largest diameter (b) of the rim or larger than the largest diameter (b) of the rim.

24. A truck having an axle according to claim 1 mounted to a chassis frame of a truck.

25. A truck according to claim 24, wherein the truck comprises two axles according to claim 1, and one axle comprising steerable wheels.

26. A truck according to claim 24, wherein the vehicle comprises a truck axle according to claim 1, and at least one axle comprising steerable wheels and a dead axle.

27. A truck according to claim 24, wherein the truck chassis structure comprises of two parallel chassis beams running in the driving direction such that the motor of one of the two hub carriers is laterally positioned next to one of the two chassis beams and the motor of the other carrier is laterally positioned next to the other chassis beam.

28. A truck according to claim 27, wherein the height of the upper end of the two parallel chassis beams is greater than the height of the upper end of the second part.

29. A truck according to claim 27, wherein an axle according to claim 18 is connected to the two chassis beams by at least (i) a 4-rod configuration consisting of two v-rods connected to the structural element and two lower longitudinal rods connected to the axle bridge structure, (ii) springs located between the chassis beams, the axle bridge structure and (iii) more than one dampers and (iv) an anti-roll bar mounted to the axle bridge structure and the chassis beams.

30. A truck according to claim 27, wherein the electric motor is adapted for regenerative braking, the axle comprises a drum brake and the vehicle is further provided with one or more bleed resistors.

31. A hub carrier comprising a stator of a direct drive electric motor and carries a rotary assembly comprising a hub,
   wherein the hub comprises a rim flange to support a rim for a single tyre,
   wherein the hub carrier comprises of a first part which is laterally positioned within the rim and tyre combination when mounted and a second part which is laterally positioned next to the rim and tyre combination when mounted;
   wherein the rotary assembly is comprised of a wheel hub shaft which is laterally positioned within the rim and tyre combination when mounted and a second part which is laterally positioned next to the rim and tyre combination when mounted; and
   wherein the second part of the hub carrier comprises the stator of the electric motor and the second part of the rotary assembly comprises a rotor of the electric motor,
   wherein the first part of the hub carrier is a spindle having an axial channel, the wheel hub shaft is a half shaft having an inner part provided with outer splines and a radially extending outer flange as an outer end,
   wherein the hub is rotatably supported by a radially outer part of the spindle, and
   wherein the inner part of the half shaft is present in the axial channel and connects to the second part of the rotary assembly by a spline connection and wherein the outer flange of the half shaft is mounted to the hub such that the rotation of the second part of the rotary assembly is transmitted to the hub by the half shaft.

32. A hub carrier according to claim 31, wherein the second part of the rotary assembly comprises of a rotor shaft which rotor shaft is axially connected to the inner part of the half shaft at an outer end of the rotor shaft and provided with a radially extending part at its inner end which radially extending part comprises the rotor or connects to the rotor and wherein the rotor shaft is rotatably supported by the second part of the hub carrier.

33. A hub carrier according to claim 32, wherein the rotor shaft is configured to rotate in three bearing, wherein the three bearings are two tapered roller bearings and one cylindrical roller bearing or wherein the three bearings comprise a double row tapered roller bearing and one cylindrical roller bearing, wherein the cylindrical roller bearing is positioned at the most inner end of the rotor shaft.

* * * * *